(12) United States Patent
Park

(10) Patent No.: US 9,151,957 B2
(45) Date of Patent: Oct. 6, 2015

(54) THREE-DIMENSIONAL IMAGE DISPLAY DEVICE

(75) Inventor: Yong Chang Park, Seongnam-si (KR)

(73) Assignee: SAMSUNG DISPLAY CO., LTD. (KR)

(*) Notice: Subject to any disclaimer, the term of this patent is extended or adjusted under 35 U.S.C. 154(b) by 268 days.

(21) Appl. No.: 13/546,063

(22) Filed: Jul. 11, 2012

(65) Prior Publication Data

US 2013/0201083 A1    Aug. 8, 2013

(30) Foreign Application Priority Data

Feb. 7, 2012 (KR) .................. 10-2012-0012566

(51) Int. Cl.
*G09G 5/00* (2006.01)
*G09G 3/00* (2006.01)
*G02B 27/22* (2006.01)
*H04N 13/04* (2006.01)

(52) U.S. Cl.
CPC ............ *G02B 27/2285* (2013.01); *H04N 13/04* (2013.01); *H04N 2213/001* (2013.01); *H04N 2213/006* (2012.01)

(58) Field of Classification Search
USPC ................................... 345/1.1–3.4
See application file for complete search history.

(56) References Cited

U.S. PATENT DOCUMENTS

| | | | |
|---|---|---|---|
| 5,172,266 A | 12/1992 | Garcia et al. | |
| 5,537,251 A * | 7/1996 | Shimada | 359/462 |
| 5,954,414 A | 9/1999 | Tsao | |
| 6,593,994 B2 | 7/2003 | Son et al. | |
| 7,165,841 B2 | 1/2007 | Satoh et al. | |
| 2003/0067419 A1 * | 4/2003 | Lambert | 345/1.1 |
| 2004/0125044 A1 * | 7/2004 | Suzuki | 345/1.1 |
| 2005/0050778 A1 | 3/2005 | Kim et al. | |
| 2005/0122394 A1 | 6/2005 | Furugoori et al. | |
| 2008/0158671 A1 | 7/2008 | Lee | |
| 2008/0204548 A1 | 8/2008 | Goulanian et al. | |
| 2011/0043714 A1 | 2/2011 | Chang | |

FOREIGN PATENT DOCUMENTS

| | | |
|---|---|---|
| JP | 08179259 | 7/1996 |
| JP | 10254078 | 9/1998 |
| JP | 2001021837 | 1/2001 |
| JP | 2002027504 | 1/2002 |
| JP | 2005128195 | 5/2005 |
| JP | 2005173212 | 6/2005 |
| JP | 2005202127 | 7/2005 |
| JP | 2005221946 | 8/2005 |
| JP | 2005295325 | 10/2005 |
| JP | 2006098971 | 4/2006 |
| JP | 2006234915 | 9/2006 |
| KR | 100344411 | 2/2004 |
| KR | 200344411 | 2/2004 |
| KR | 1020050088768 | 9/2005 |
| KR | 100613146 | 8/2006 |
| KR | 100614202 | 8/2006 |
| KR | 100658671 | 12/2006 |

* cited by examiner

*Primary Examiner* — Amr Awad
*Assistant Examiner* — Andre Matthews
(74) *Attorney, Agent, or Firm* — Cantor Colburn LLP

(57) ABSTRACT

A three-dimensional ("3D") image display device includes a display panel assembly which displays a two-dimensional ("2D") image including a left region and a right region, which are divided by an axis, and the display panel assembly repeatedly rotates back and forth by a predetermined angle with respect to the axis.

8 Claims, 23 Drawing Sheets

THREE-DIMENSIONAL IMAGE DISPLAY DEVICE

This application claims priority to Korean Patent Application No. 10-2012-0012566, filed on Feb. 7, 2012, and all the benefits accruing therefrom under 35 U.S.C. §119, the content of which in its entirety is herein incorporated by reference.

BACKGROUND (a) Field

A three-dimensional ("3D") image display device is provided.

(b) Description of the Related Art

In general, a 3D image display technology realizes a 3D effect of an object using binocular parallax for recognizing a 3D effect at a short distance. That is, when different two-dimensional ("2D") images are reflected in a left eye and a right eye, respectively, and the image reflected in the left eye (hereinafter referred to as a "left eye image") and the image reflected in the right eye (hereinafter referred to as a "right eye image") are transmitted to a brain, the left eye image and the right eye image are fused in the brain to be recognized as a 3D image having depth perception.

A 3D image display device using the binocular parallax is typically classified into a stereoscopic type using glasses such as shutter glasses, polarized glasses or the like, and an autostereoscopic type without using glasses, in which a lenticular lens, a parallax barrier, or the like, is disposed in a display device.

SUMMARY

In an exemplary embodiment, a three-dimensional ("3D") image display device includes a display panel assembly which displays a two-dimensional ("2D") image including a left region and a right region, which are divided by an axis, and the display panel assembly repeatedly rotates back and forth by a predetermined angle with respect to the axis.

In an exemplary embodiment, the 3D image display device may further include a first holder disposed at a side portion of the left region of the display panel assembly, and a second holder disposed at a side portion of the right region of the display panel assembly.

In an exemplary embodiment, the 3D image display device may further include a supporting member disposed at an end of the display panel assembly, and a moving member which repeatedly moves while being in contact with the supporting member, where the display panel assembly is rotated by the supporting member and the moving member.

In an exemplary embodiment, the moving member may include a body, a bar which reciprocally moves within the body, and a spring member fixed to an end of the bar, where the spring is compressed and relaxed, and where the spring member may move along the supporting member while being in contact with the supporting member.

In an exemplary embodiment, the moving member may include a body, a bar which rotates in a clockwise direction or a counterclockwise direction, and a first protrusion fixed to a first end of the bar and a second protrusion fixed to a second end of the bar, where the first protrusion and the second protrusion alternately push or pull the supporting member while the first protrusion and the second protrusion are rotated being fixed to the bar.

In an exemplary embodiment, the moving member may include a body, a bar which rotates in a clockwise direction or a counterclockwise direction, a protrusion fixed to an end of the bar, and a spring member fixed to the supporting member, where the protrusion may alternately push or pull the supporting member while the protrusion is rotated being fixed to the bar.

In an exemplary embodiment, the 3D image display may further include a fixing member which fixes the display panel assembly and rotates back and forth by the predetermined angle by a repeated movement of the moving member, where the moving member has a sinusoidal rail shape, and where a rotation angle of the display panel assembly is substantially the same as a rotation angle of the fixing member.

In an exemplary embodiment, the display panel assembly may display a compensated 2D image, and the compensated 2D image may be an image, in which the left region of the 2D image is expanded and the right region of the 2D image is reduced, or an image in which the left region of the 2D image is reduced and the right region of the 2D image is expanded.

In an exemplary embodiment, a 3D image display device includes a display panel assembly which displays a 2D image including a left region and a right region, where a front surface of the display panel assembly repeatedly moves back and forth by a predetermined distance.

In an exemplary embodiment, the 3D image display device may further include an axis which fixes the display panel assembly, and a guide member along which the axis moves back and forth.

In an exemplary embodiment, the display panel assembly may display a compensated 2D image, and the compensated 2D image may be an image, in which an entire size of the 2D image is expanded or reduced.

In an exemplary embodiment, a 3D image display device includes a display panel assembly which displays a 2D image divided into three regions including a left region, a center region and a right region, where the display panel assembly includes a first sub-display panel, a second sub-display panel, a third sub-display panel, a fourth sub-display panel and a fifth sub-display panel, and with reference to the first sub-display panel, where the second sub-display panel and the third sub-display panel are disposed forward and rearward, respectively, at the left side of the first sub-display panel, and where the fourth sub-display panel and the fifth sub-display panel are disposed forward and rearward, respectively, at the right side of the first sub-display panel.

In an exemplary embodiment, the first sub-display panel to the fifth sub-display panel may have substantially the same size as each other.

In an exemplary embodiment, the first sub-display panel to the fifth sub-display panel may be transparent display panels.

In an exemplary embodiment, the center region of the 2D image may be displayed in the first sub-display panel, the left region of the 2D image may be displayed in the second sub-display panel or the third sub-display panel, and the right region of the 2D image may be displayed in the fourth sub-display panel or the fifth sub-display panel.

In an exemplary embodiment, when the first sub-display panel, the third sub-display panel and the fourth sub-display panel display the 2D image, the second sub-display panel and the fifth sub-display panel may not display the 2D image.

In an exemplary embodiment, when the first sub-display panel, the second sub-display panel and the fifth sub-display panel display the 2D image, the third sub-display panel and the fourth sub-display panel may do not display the 2D image.

In an exemplary embodiment, the 3D image display device may further include a reflecting member which sequentially reflects the 2D image while the reflecting member rotates by a predetermined angle with respect to a center axis thereof.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
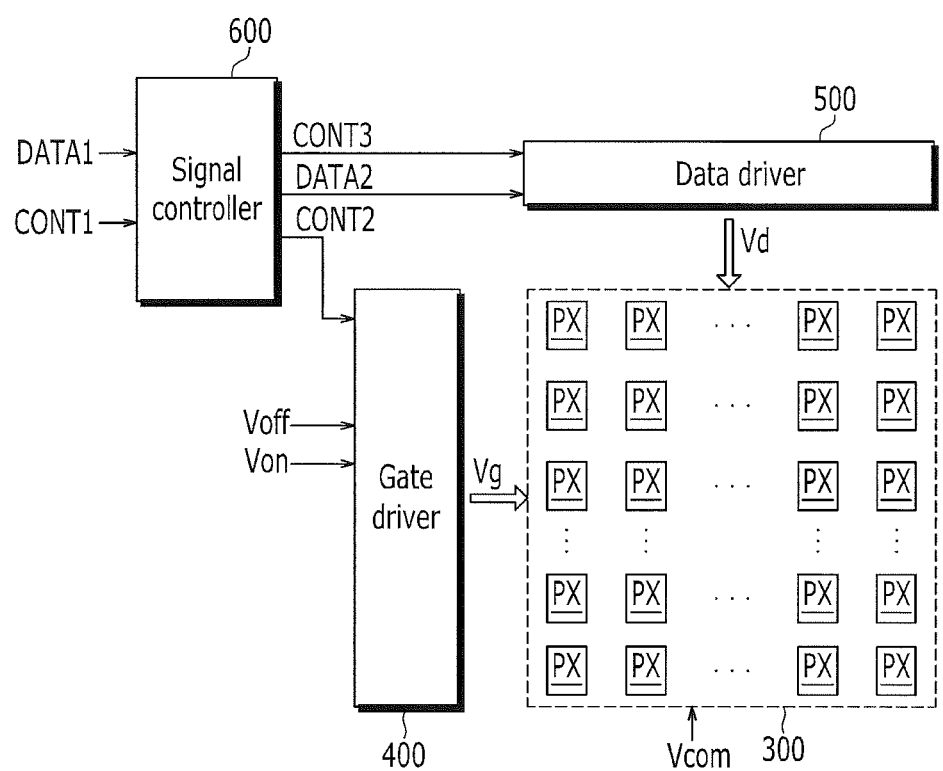
FIG. 1 is a block diagram showing an exemplary embodiment of a three-dimensional ("3D") image display device according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

FIG. 1 is a block diagram showing an exemplary embodiment of a three-dimensional ("3D") image display device according to the invention.

Referring to FIG. 1, an exemplary embodiment of a 3D image display device includes a display panel assembly 300, a gate driver 400, a data driver 500 and a signal controller 600.

The display panel assembly 300 includes a plurality of signal lines (not shown) and a plurality of pixels PX connected to the signal lines and arranged substantially in a matrix format. The display panel assembly 300 may include a display panel, such as a liquid crystal display panel, an organic light emitting panel, a plasma display panel and an electrophoresis display panel, for example, but not being limited thereto. In an exemplary embodiment, the display panel assembly 300 may further include a light source.

The signal lines include a plurality of gate lines that transmits a gate signal (referred to as "a scanning signal") and a plurality of data lines that transmits a data voltage. The gate lines are arranged substantially parallel to each other and extend substantially in a row direction, and the data lines are arranged substantially parallel to each other and extend substantially in a column direction.

The pixel PX may uniquely represents one of primary colors (i.e., spatial division) or each pixel PX sequentially represents the primary colors in turn (i.e., temporal division), such that a spatial or temporal sum of the primary colors is recognized as a specific color. In an exemplary embodiment, the primary colors may include red, green and blue colors, for example, but not being limited thereto.

The gate driver 400 is connected to the gate lines of the display panel assembly 300 and applies a gate signal having voltage levels including a gate-on voltage Von and a gate-off voltage Voff to the gate lines.

The data driver 500 is connected to the data lines of the display panel assembly 300 and applies the data voltage to the data lines.

The signal controller 600 controls operations of the gate driver 400 and the data driver 500.

In an exemplary embodiment, at least one of the gate driver 400, the data driver 500 and the signal controller 600 may be disposed, e.g., mounted, on a display device as an integrated circuit ("IC") chip. In an alternative exemplary embodiment, the at least one of the gate driver 400, the data driver 500 or the signal controller 600 may be integrated with the display panel along with other elements.

The signal controller 600 receives an input image signal DATA1 and an input control signal CONT1 for controlling the display thereof from an external graphics controller (not shown). In an exemplary embodiment, the input control signal CONT1 may include a vertical synchronizing signal, a horizontal synchronizing signal, a main clock signal and a data enable signal, for example. The signal controller 600 processes the input image signal DATA1 based on the input image signal DATA1 and the input control signal CONT1 such that the processed input image signal DATA2 is corresponding to the operating conditions of the display panel assembly 300. In an exemplary embodiment, the signal controller 600 generates a gate control signal CONT2 and a data control signal CONT3. In such an embodiment, the signal controller 600 outputs the gate control signal CONT2 to the gate driver 400, and outputs the data control signal CONT3 and the processed image signals DATA2 to the data driver 500.

The gate control signal CONT2 may include a scanning start signal for informing of a start of the frame, a gate clock signal for controlling output timing of the gate-on voltage Von, and an output enable signal for restricting duration of the gate-on voltage Von.

The data control signal CONT3 may include a horizontal synchronization start signal for informing of a transmission start of the image signal DATA2, a load signal for applying the data voltage to the data lines, an inversion signal for inverting the polarity of the data voltage with respect to the common voltage Vcom (hereinafter, a polarity of the data voltage with respect to the common voltage Vcom is referred to as "a polarity of the data voltage"), and a data clock signal.

The data driver 500 converts the processed image signal DATA2 into the data voltage based on the data control signal CONT3 from the signal controller 600 and applies the data voltage to the data lines.

The gate driver 400 applies the gate-on voltage Von to the gate lines based on the gate control signal CONT2 from the signal controller 600 to turn on the switching element connected to the gate lines, and thereby the data voltage applied to the data line is applied to a corresponding pixel though the turned-on switching element.

In such an embodiment, a difference between the data voltage applied to the pixel and the common voltage Vcom is represented as a pixel voltage.

Figure 2:
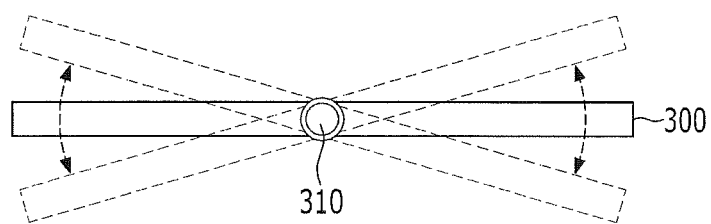
FIG. 2 is a top plan view of an exemplary embodiment of a 3D image display device, schematically showing a physical operation thereof, according to the invention.
Figure 3:
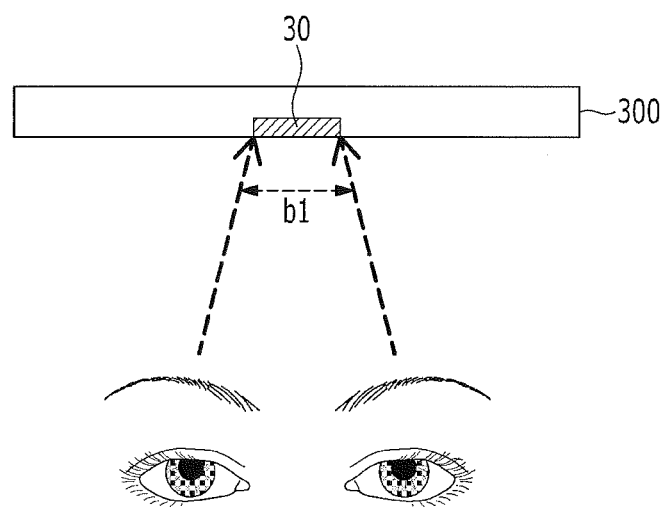
FIG. 3 and FIG. 4 are schematic views showing a change of binocular disparity of an exemplary embodiment of a 3D image display device according to the invention.
Figure 4:
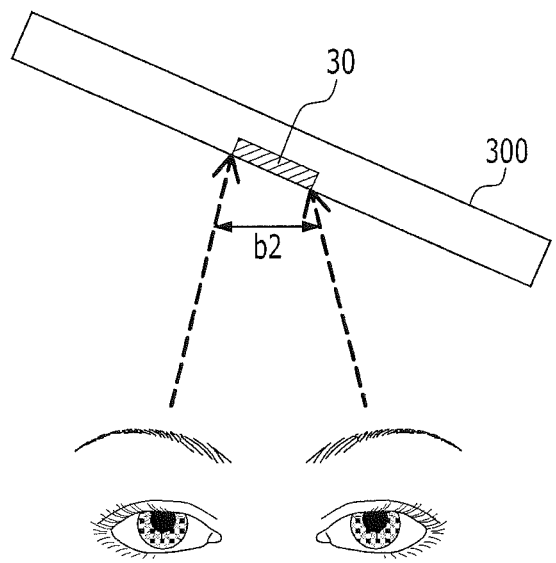

FIG. 2 is a top plan view showing a physical operation of an exemplary embodiment of a 3D image display device according to the invention, and FIG. 3 and FIG. 4 are schematic views showing a change of binocular disparity of an exemplary embodiment of a 3D image display device according to the invention.

Referring to FIG. 2, the display panel assembly 300 repeatedly rotates back and forth by a predetermined angle with reference to an axis 310. In an exemplary embodiment, the axis 310 divides the display panel assembly 300 into the left region and the right region. In such an embodiment, when the left region of the display panel assembly 300 moves forth by a first angle, the right region of the display panel assembly 300 moves back by the first angle. In such an embodiment, when the right region of the display panel assembly 300 moves forth by a first angle, the left region of the display panel assembly 300 moves back by the first angle. In such an embodiment, the movement of the left and right regions of the display panel assembly 300 is repeated.

Referring to FIG. 3 and FIG. 4, the display panel assembly 300 displays a normal two-dimensional ("2D") image 30, and a binocular disparity b1 for the 2D image 30 when the display panel assembly 300 is not rotating is greater than the binocular disparity b2 for the 2D image 30 when the display panel assembly 300 rotates. When the display panel assembly 300 repeatedly rotates back and forth by the predetermined angle with respect to the axis 310, the binocular disparity for the 2D image 30 is repeatedly changed, and thereby the 2D image 30 is recognized as the 3D image having depth perception. In one exemplary embodiment, for example, the display panel assembly 300 may rotate at least three times during 1 second, and thereby the 2D image 30 may be recognized as the 3D image having the depth perception. In such an embodiment, an autostereoscopically displayed image is generated using the input of the 2D image without an input of the 3D image other than the 2D image.

Figure 5:
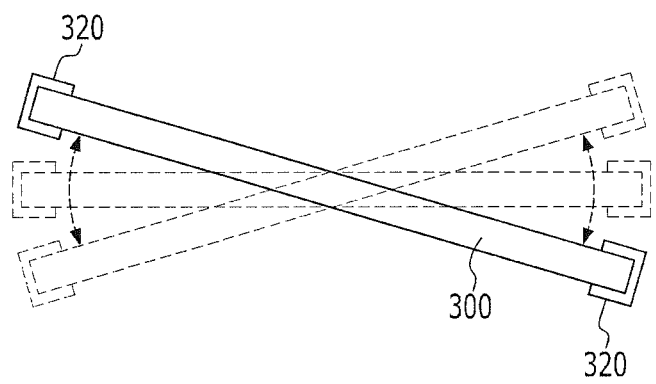
FIG. 5 is a top plan view schematically showing a physical operation of an exemplary embodiment of a 3D image display device according to the invention.

FIG. 5 is a top plan view schematically showing a physical operation of an exemplary embodiment of a 3D image display device according to the invention.

Referring to FIG. 5, the display panel assembly 300 is repeatedly rotated back and forth by the predetermined angle by a holder 320 disposed at side portions, e.g., a left side portion and a right side portion, of the display panel assembly 300. Accordingly, as shown in FIG. 3 and FIG. 4, the binocular disparity for the 2D image 30 is repeatedly changed, and the 2D image 30 is thereby recognized as the 3D image having the depth perception. In one exemplary embodiment, for example, the display panel assembly 300 may be rotated at least three times during 1 second, and thereby the 2D image 30 may be recognized as the 3D image having the depth perception. In such an embodiment, an autostereoscopically displayed image is generated using the input of the 2D image without an input of the 3D image other than the 2D image.

Figure 6:
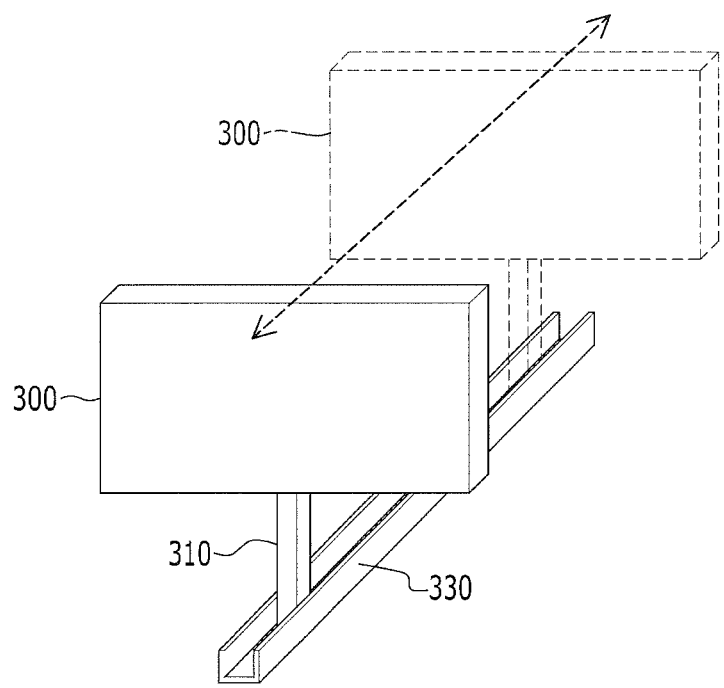
FIG. 6 is a perspective view schematically showing a physical operation of an exemplary embodiment of a 3D image display device according to the invention.
Figure 7:
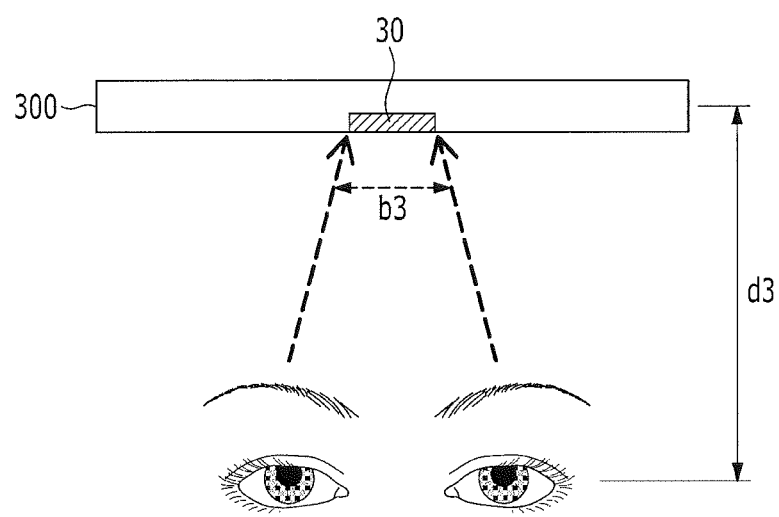
FIG. 7 and FIG. 8 are schematic views showing a change of binocular disparity of an exemplary embodiment of a 3D image display device according to the invention.
Figure 8:
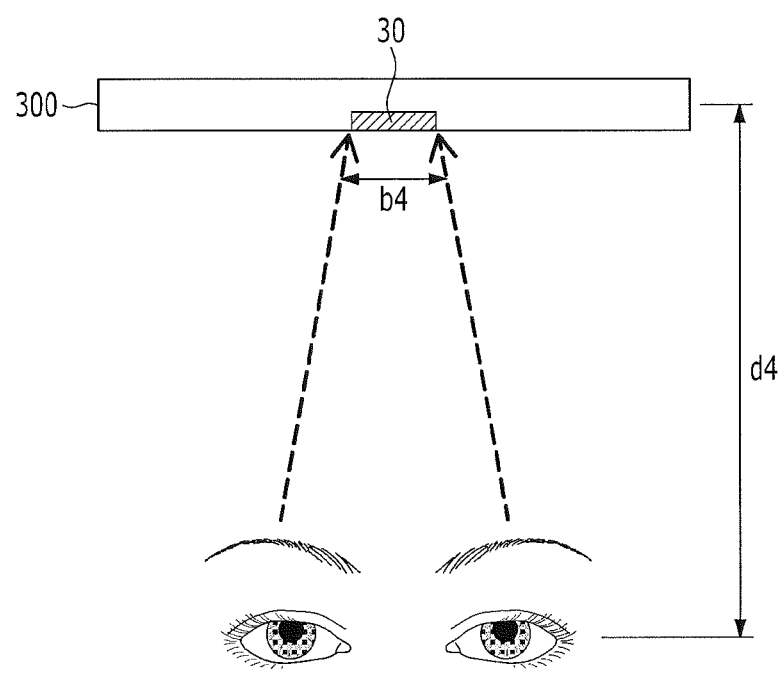

FIG. 6 is a perspective view schematically showing a physical operation of an exemplary embodiment of a 3D image display device according to the invention, and FIG. 7 and FIG. 8 are schematic views showing a change of binocular disparity of an exemplary embodiment of a 3D image display device according to the invention.

Referring to FIG. 6, the display panel assembly 300 is fixed to the axis 310, and the axis 310 moves back and forth along a guide member 330. An entire surface of the display panel assembly 300 is repeatedly moved back and forth by a predetermined distance. In one exemplary embodiment, for example, the entire surface of the display panel assembly 300 is moved forth to be relatively close to the eyes, and then the entire surface of the display panel assembly 300 is moved back to be relatively far from the eyes. In such an embodiment, the back and forth movement of the entire surface of the display panel may be repeated.

Referring to FIG. 7 and FIG. 8, the display panel assembly 300 displays the general 2D image 30, and the binocular disparity b3 for the 2D image 30 when the display panel assembly 300 is relatively close to the eyes is greater than the binocular disparity b4 for the 2D image 30 when the display panel assembly 300 is relatively far from the eyes. When the entire surface of the display panel assembly 300 is repeatedly moved back and forth by the predetermined distance, the binocular disparity for the 2D image 30 is repeatedly changed, and thereby the 2D image 30 is recognized as the 3D image having the depth perception. In one exemplary embodiment, for example, the display panel assembly 300 may be moved back and forth at least three times during 1 second, and thereby the 2D image 30 may be recognized as the 3D image having the depth perception. In such an embodiment, an autostereoscopically displayed image is generated using the input of the 2D image without an input of the 3D image other than the 2D image.

A distance d3 between the display panel assembly 300 and the eyes when the display panel assembly 300 is relatively close to the eyes is less than the distance d4 between the display panel assembly 300 and the eyes when the display panel assembly 300 is relatively far from to the eyes. In one exemplary embodiment, for example, the predetermined distance may be equal to or less than a value of the difference between the distance d4 and the distance d3.

Figure 9:
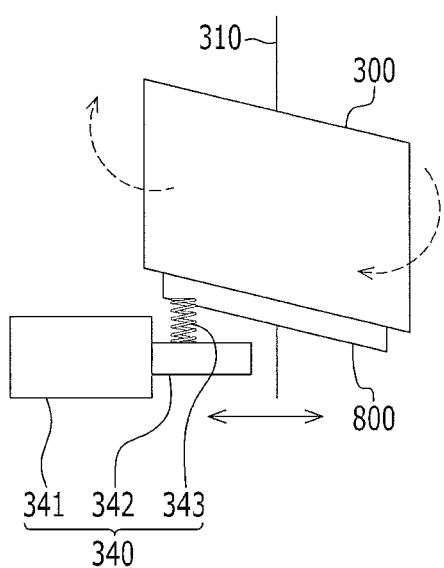
FIG. 9 to FIG. 11 are block diagrams schematically showing a physical operation of an exemplary embodiment of a 3D image display device according to the invention.
Figure 10:
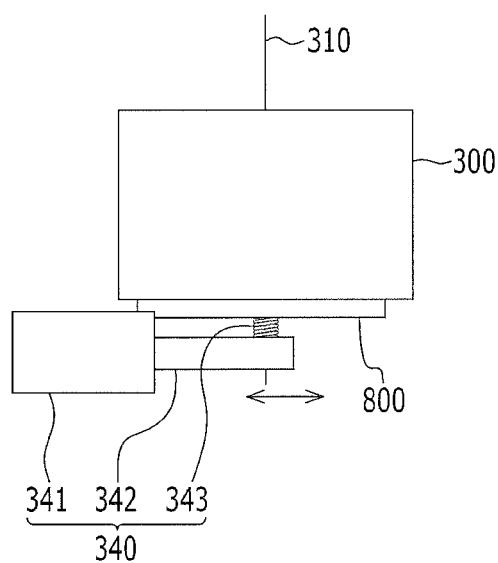
Figure 11:
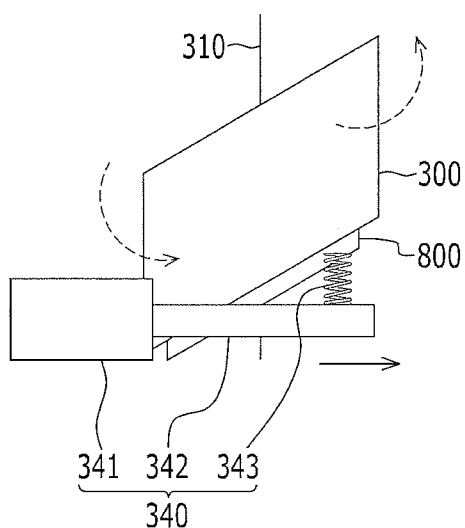

FIG. 9 to FIG. 11 are block diagrams schematically showing a physical operation of an exemplary embodiment of a 3D image display device according to the invention.

Referring to FIG. 9 to FIG. 11, the 3D image display device includes a supporting member 800 disposed at an end, e.g., a lower end, of the display panel assembly 300. In an alternative exemplary embodiment, the supporting member 800 may be positioned at the upper end of the display panel assembly 300. In an exemplary embodiment, the 3D image display device further include a moving member 340 including a body 341, a bar 342 that reciprocally moves within the body 341, and a spring member 343 fixed to an end of the bar 342 and which is compressed and relaxed. The spring member 343 moves along the supporting member 800 while being in contact with the supporting member 800.

In an exemplary embodiment, as shown in FIG. 9, the bar 342 moves inside of the body 341 with respect to the position of the bar 342 shown in FIG. 10, or as shown in FIG. 11, the bar 342 moves out of the body 341 with respect to the position of the bar 342 shown in FIG. 10, and this operation is repeated. The spring member 343 fixed to the bar 342 may be compressed when the bar 342 is positioned as shown in FIG. 10, and the spring member 343 fixed to the bar may be relaxed when the bar 342 is positioned as shown in FIG. 10 shown in FIG. 9 and FIG. 10. As shown in FIG. 9 and FIG. 11, the supporting member 800 is pushed while the spring member 343 is relaxed, and accordingly, the display panel assembly 300 repeatedly rotates back and forth by the predetermined angle with respect to the axis 310.

Figure 12:
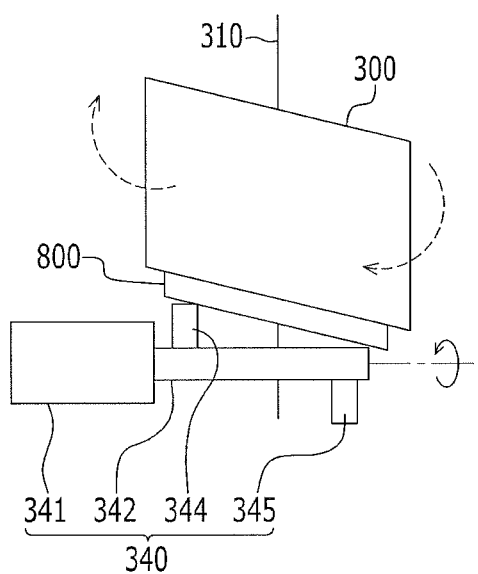
FIG. 12 to FIG. 14 are block diagrams schematically showing a physical operation of an alternative exemplary embodiment of a 3D image display device according to the invention.
Figure 13:
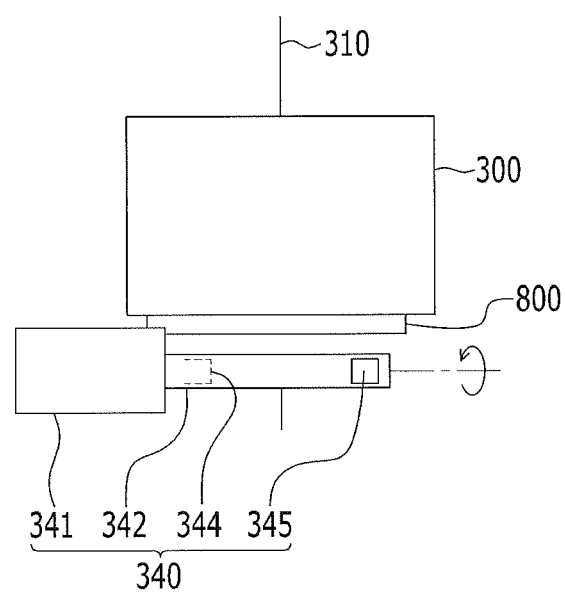
Figure 14:
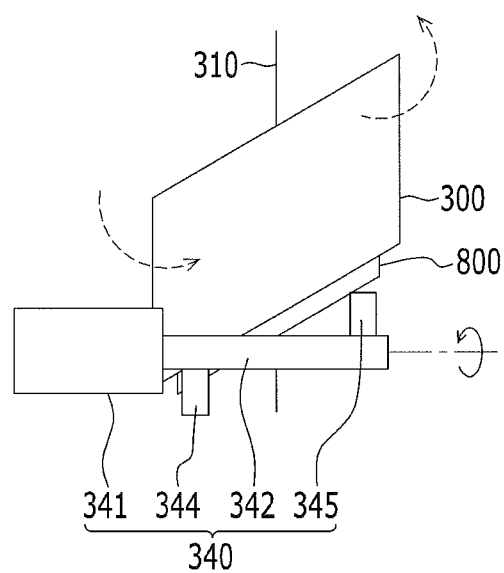

FIG. 12 to FIG. 14 are block diagrams schematically showing a physical operation of an alternative exemplary embodiment of a 3D image display device according to the invention.

Referring to FIG. 12 to FIG. 14, in an exemplary embodiment, the supporting member 800 is positioned at the lower end of the display panel assembly 300. In an alternative exemplary embodiment, the supporting member 800 may be positioned at the upper end. The moving member 340 includes a body 341, a bar 342 that rotates in the clockwise direction or the counterclockwise direction, and a first protrusion 344 and a second protrusion 345 that are fixed at respective ends, e.g., first and second ends, of the bar 342. The first protrusion 344 and the second protrusion 345 alternately push and pull the supporting member 800 while rotating.

In an exemplary embodiment, when the bar 342 of FIG. 13 rotates in the clockwise direction as shown FIG. 14, the second protrusion 345 pushes the right side portion of the supporting member 800, and thereby the display panel assembly 300 is rotated by the predetermined angle with respect to the axis 310. In an alternative exemplary embodiment, when the bar 342 of FIG. 14 rotates in the clockwise direction as shown in FIG. 12, the first protrusion 344 pushes the left side portion of the supporting member 800, and thereby the display panel assembly 300 is rotated by the predetermined angle with respect to the axis 310. In an exemplary embodiment, when the bar 342 continuously rotates in the clockwise direction, the display panel assembly 300 is repeatedly rotated back and forth by the predetermined angle with respect to the axis 310. In an alternative exemplary embodiment, the bar 342 may rotate in the counterclockwise direction, and thereby the display panel assembly 300 may be repeatedly rotated back and forth by the predetermined angle with respect to the axis 310.

Figure 15:
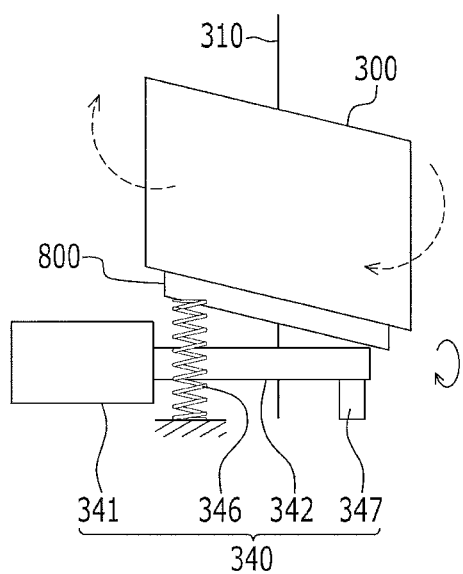
FIG. 15 to FIG. 17 are block diagrams schematically showing a physical operation of another alternative exemplary embodiment of a 3D image display device according to the invention.
Figure 16:
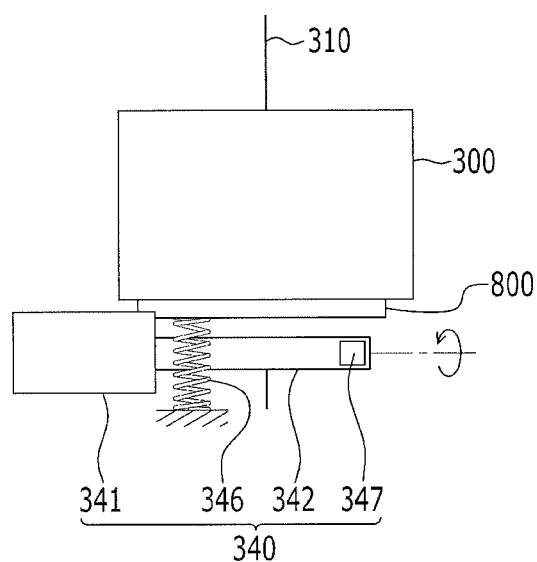
Figure 17:
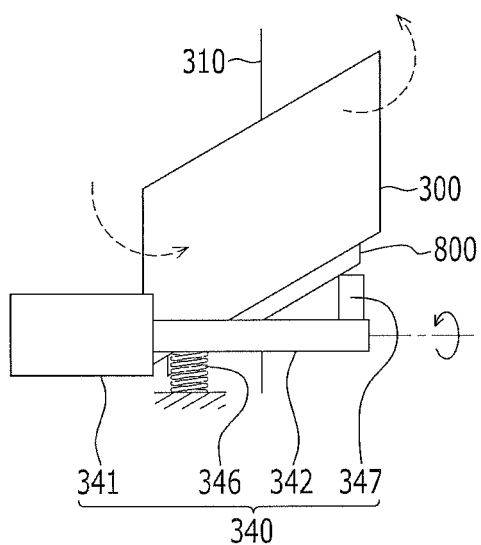
Figure 18:
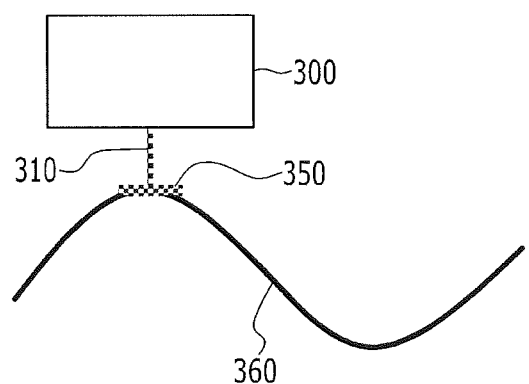
FIG. 18 to FIG. 21 are block diagrams schematically showing a physical operation of an exemplary embodiment of a 3D image display device according to the invention.
Figure 19:
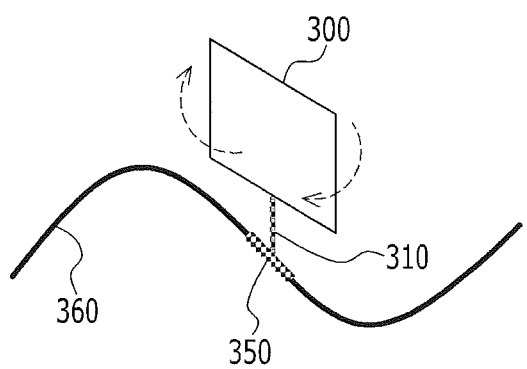
Figure 20:
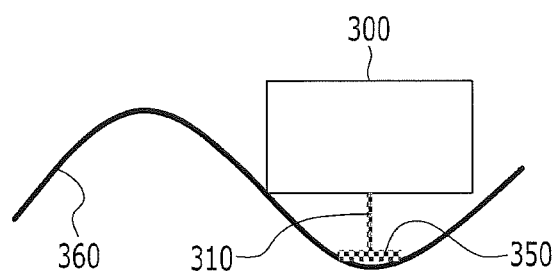
Figure 21:
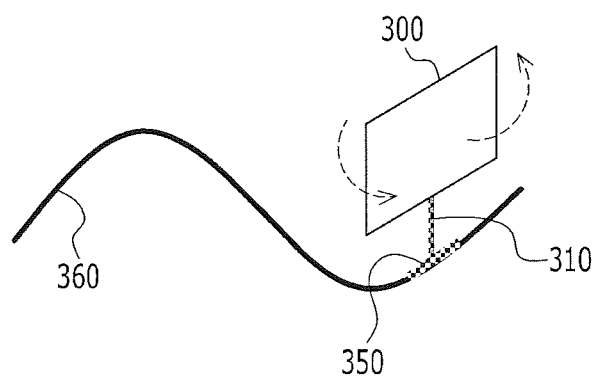

FIG. 15 to FIG. 17 are block diagrams schematically showing a physical operation of another alternative exemplary embodiment of a 3D image display device according to the invention.

Referring to FIG. 15 to FIG. 17, in an exemplary embodiment, the supporting member 800 is disposed at the lower end of the display panel assembly 300. In an alternative exemplary embodiment, the supporting member 800 may be disposed at the upper end of the display panel assembly 300. The left side portion of the supporting member 800 is fixed to a spring member 346. The moving member 340 includes a body 341, a bar 342 that rotates in the clockwise direction or the counterclockwise direction, and a third protrusion 347 fixed to the end of the bar 342. In such an embodiment, the third protrusion 347 is fixed to the bar 342 and rotated thereby such that the third protrusion 347 pulls or pushes the right side portion of the supporting member 800. In an alternative exemplary embodiment, the right side portion of the supporting member 800 may be fixed by the spring member 346 and the left side portion of the supporting member 800 may be pulled or pushed by the protrusion 347.

In an exemplary embodiment, when the bar 342 of FIG. 16 rotates in the clockwise direction like the bar 342 of FIG. 17, the third protrusion 347 pushes the right side portion of the supporting member 800, and thereby the display panel assembly 300 is rotated by the predetermined angle with respect to the axis 310 and the spring member 346 is compressed. When the compressed spring member 346 is relaxed, the left side portion of the supporting member 800 is pushed by the spring member 346, and thereby the display panel assembly 300 is rotated by the predetermined angle with respect to the axis 310. In such an embodiment, when the bar 342 continuously rotates in the clockwise direction, the display panel assembly 300 is repeatedly rotated back and forth by the predetermined angle with respect to the axis 310. In an alternative exemplary embodiment, the bar 342 may rotate in the counterclockwise direction, and thereby the display panel assembly 300 may be repeatedly rotated back and forth by the predetermined angle with respect to the axis 310.

FIG. 18 to FIG. 21 are block diagrams schematically showing a physical operation of an exemplary embodiment of a 3D image display device according to the invention.

Referring to FIG. 18 to FIG. 21, the display panel assembly 300 is fixed to the axis 310, and a fixing member 350 fixed to the axis 310 rotates back and forth by the predetermined angle with respect to the axis 310 by the repeated movement of a moving member 360 having a sinusoidal rail shape. In such an embodiment, the display panel assembly 300 is repeatedly rotated back and forth by substantially the same angle as the rotation angle of the fixing member 350 with respect to the axis 310.

Figure 22:
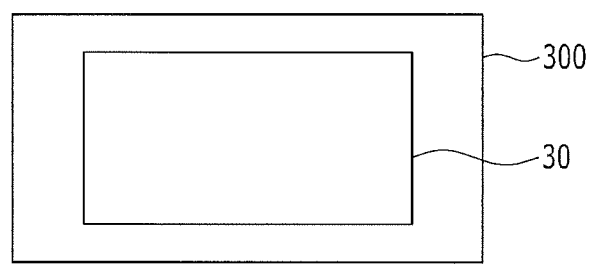
FIG. 22 and FIG. 23 are block diagrams showing a two-dimensional, ("2D") image compensated according to a physical operation of an exemplary embodiment of a 3D image display device according to the invention.
Figure 23:
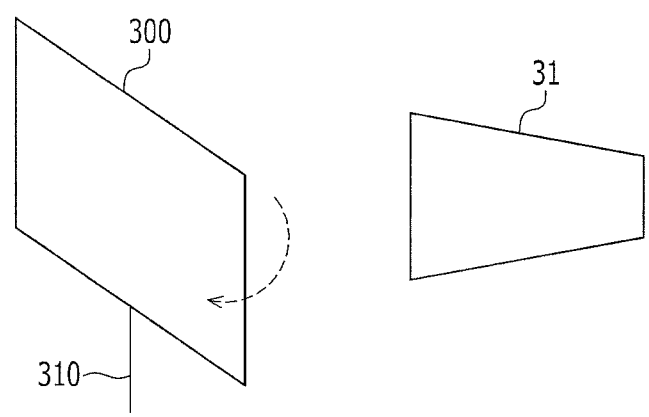

FIG. 22 and FIG. 23 are block diagrams schematically showing a 2D image compensated according to a physical operation of an exemplary embodiment of a 3D image display device according to the invention.

Referring to FIG. 22, in an exemplary embodiment, when the display panel assembly 300 is viewed from a front side, an original 2D image 30 displayed on the display assembly 300 is substantially a rectangle. Referring to FIG. 23, when the display panel assembly 300 is rotated with respect to the axis 310, the compensated 2D image 31 of a trapezoid shape is displayed on the display panel assembly 300. As shown in FIG. 23, when the display panel assembly 300 is rotated, the left side region of the 2D image 30 of the rectangle that is not compensated appears to be reduced and the right side region appears to be expanded such that the compensated 2D image 31, in which the left side region of the original 2D image 30 of the rectangle is expanded and the right side region thereof is reduced, is displayed to the display panel assembly 300 to compensate the distortion of the original 2D image 30. In such an embodiment, when the display panel assembly 300 is rotated in a direction opposite to the display panel assembly 300 shown in FIG. 23, the compensated 2D image 31 including an expanded right side region of the original 2D image 30 of the rectangle and a reduced left side region is displayed to the display panel assembly 300.

The reduction or expansion of the compensated 2D image 31 from the original 2D image 30 may be determined based on the rotation angle of the display panel assembly 300. In an exemplary embodiment, as the rotation angle of the display panel assembly 300 increases, the degree of reduction or expansion of the compensated 2D image 31 from the original 2D image 30 may increases. In such an embodiment, as the rotation angle of the display panel assembly 300 decreases, the degree of reduction or expansion of the compensated 2D image 31 from the original 2D image 30 may decrease.

Figure 24:
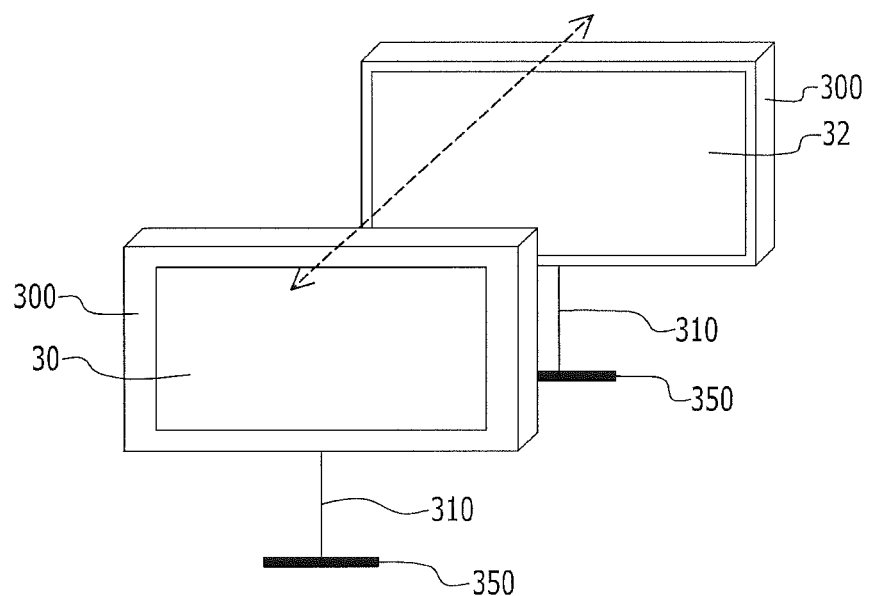
FIG. 24 is a perspective view of an exemplary embodiment of a 3D image display device according to the invention, schematically showing a 2D image compensated based on a physical operation thereof.

FIG. 24 is a perspective view of an exemplary embodiment of a 3D image display device according to the invention, schematically showing a 2D image compensated according to a physical operation thereof.

Referring to FIG. 24, in an exemplary embodiment, when the display panel assembly 300 is moved from the front side to the rear side, an entire size of the compensated 2D image 32 is increased. In such an embodiment, when the display panel assembly 300 is moved from the rear side to the front side, the entire size of the compensated 2D image 32 is decreased. In such an embodiment, when the display panel assembly 300 is moved back and forth, a viewer in a fixed position may recognize the compensation 2D images 32 as an image of a same size by controlling the size of the compensation 2D image 32.

FIGS. 25 to 29 are schematic views showing an exemplary embodiment of a 3D image display device according to the invention.

Figure 25:
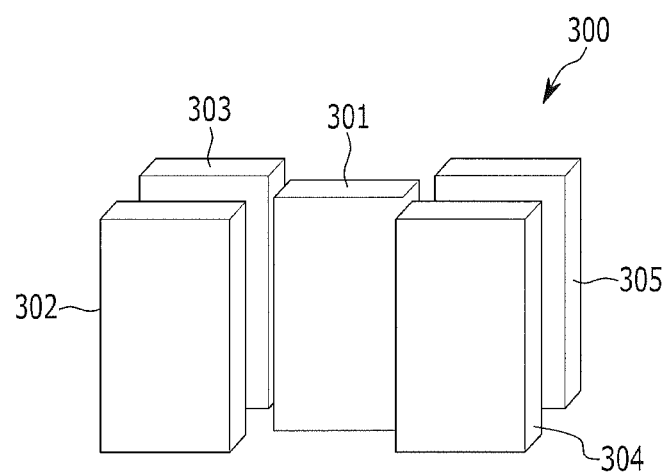
FIG. 25 to FIG. 29 are schematic views showing an exemplary embodiment of a 3D image display device according to the invention.
Figure 26:
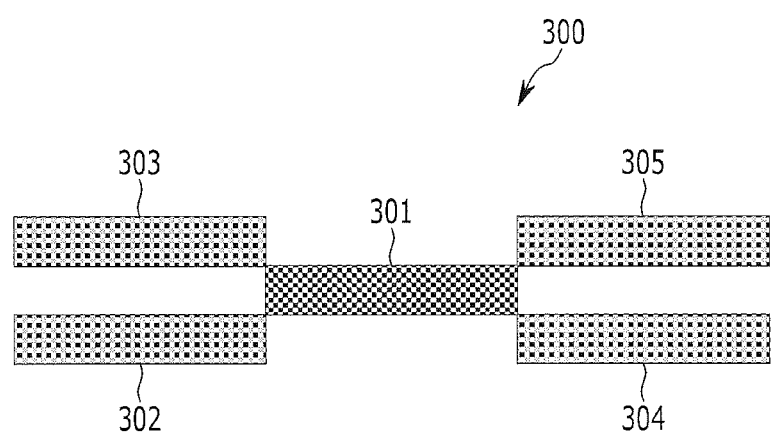

Referring to FIG. 25 and FIG. 26, an exemplary embodiment of the display panel assembly 300 includes a first sub-display panel 301, a second sub-display panel 302, a third sub-display panel 303, a fourth sub-display panel 304 and a fifth sub-display panel 305. In such an embodiment, the first sub-display panel 301 to the fifth sub-display panel 305 may be transparent display panels. In an exemplary embodiment, the second sub-display panel 302 and the third sub-display panel 303 are positioned forward and rearward, respectively, at the left side of the first sub-display panel 301, and the fourth sub-display panel 304 and the fifth sub-display panel 305 are positioned forward and rearward, respectively, at the right side of the first sub-display panel 301. The sizes of the first sub-display panel 301 to the fifth sub-display panel 305 may be substantially the same as each other. The 2D image displayed by the display panel assembly 300 is divided into three regions including a left region, a center region and a right region. In an exemplary embodiment, the center region of the 2D image is displayed in the first sub-display panel 301, the left region of the 2D image is displayed in the second sub-display panel 302 or the third sub-display panel 303, and the right region of the 2D image is displayed in the fourth sub-display panel 304 or the fifth sub-display panel 305.

Figure 27:
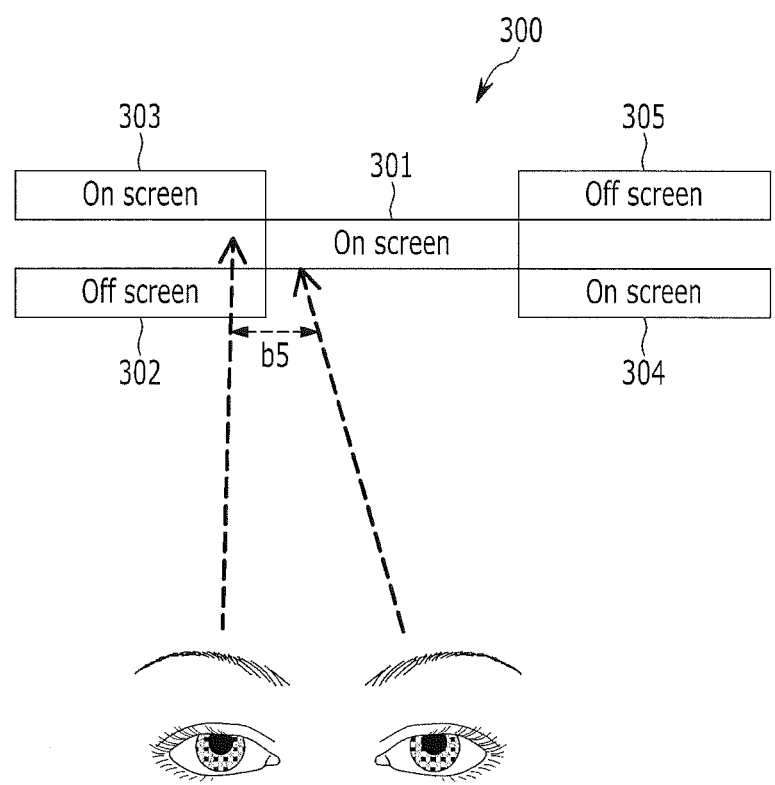
Figure 28:
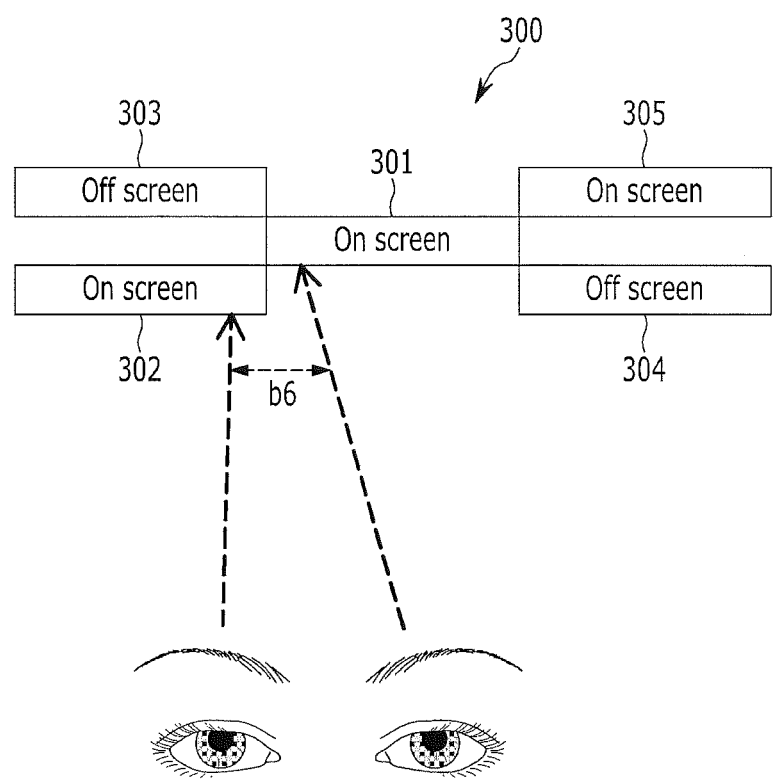

Referring to FIG. 27, the 2D image may be displayed in the first sub-display panel 301, the third sub-display panel 303 and the fourth sub-display panel 304, and the 2D image may not be displayed in the second sub-display panel 302 and the fifth sub-display panel 305. Referring to FIG. 28, the 2D image may be displayed in the first sub-display panel 301, the second sub-display panel 302 and the fifth sub-display panel 305, and the 2D image may not be displayed in the third sub-display panel 303 and the fourth sub-display panel 304. In an exemplary embodiment, the operations of the display panel assembly 300 shown in FIG. 27 and FIG. 28 are repeated such that an effect that occurs when the display panel assembly 300 is repeatedly rotated back and forth occurs. In such an embodiment, the binocular disparity b5 of the display panel assembly 300 shown in FIG. 27 is less than the binocular disparity b6 of the display panel assembly 300 shown in FIG. 28 such that the binocular disparity for the 2D image is repeatedly changed, and the 2D image is thereby recognized as the 3D image having the depth perception. In such an embodiment, an autostereoscopically displayed image is generated using the input of the 2D image without an input of the 3D image other than the 2D image.

Figure 29:
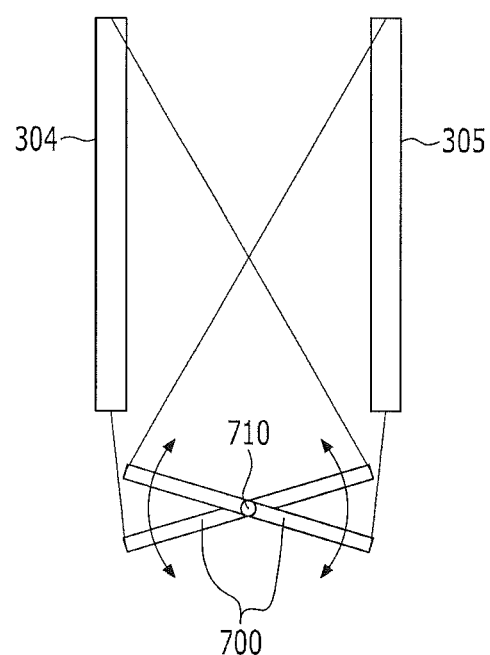

Referring to FIG. 29, in an exemplary embodiment, when a reflecting member 700 rotates by the predetermined angle with respect to a center axis 710, the 2D image is reflected by the reflecting member 700 and is sequentially displayed in the fourth sub-display panel 304 and the fifth sub-display panel 305. In such an embodiment, the 2D image is reflected by the reflecting member 700 and is sequentially displayed in the second sub-display panel 302 and the third sub-display panel 303.

An exemplary embodiment according to the invention may display the 3D image using the 2D image, and may display the 3D image using autostereoscopy.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A three-dimensional image display device comprising:
    a display panel assembly which displays a two-dimensional image divided into three regions including a left region, a center region and a right region,
    wherein the display panel assembly comprises a first sub-display panel, a second sub-display panel, a third sub-display panel, a fourth sub-display panel and a fifth sub-display panel,
    wherein the second sub-display panel and the third sub-display panel are disposed in a forward plane and a rearward plane, respectively, on a left side of the first sub-display panel, and
    wherein the fourth sub-display panel and the fifth sub-display panel are disposed in the forward plane and the rearward plane, respectively, relative to a plane the first sub-display is disposed in and on a right side of the first sub-display panel,
    wherein the second sub-display panel and the fourth sub-display panel are transparent display panels,
    wherein when the second sub-display panel and the fifth sub-display panel display the two-dimensional image, the third sub-display panel and the fourth sub-display panel do not display an image and the fourth sub-display panel transmit the two-dimensional image displayed on the fifth sub-display panel,
    wherein the third sub-display panel and the fourth sub-display panel display the two-dimensional image, the second sub-display panel and the fifth sub-display panel do not display the image and the second sub-display panel transmit the two-dimensional image displayed on the third sub-display panel, and
    wherein the second sub-display panel, the fifth sub-display panel and the third sub-display panel, the fourth sub-display panel display the two-dimensional image alternately.

2. The three-dimensional image display device of claim 1, wherein
    the first sub-display panel to the fifth sub-display panel have substantially a same size as each other.

3. The three-dimensional image display device of claim 1, wherein
    the first sub-display panel to the fifth sub-display panel are transparent display panels.

4. The three-dimensional image display device of claim 3, wherein
    the center region of the two-dimensional image is displayed in the first sub-display panel,
    the left region of the two-dimensional image is displayed in the second sub-display panel or the third sub-display panel, and
    the right region of the two-dimensional image is displayed in the fourth sub-display panel or the fifth sub-display panel.

5. The three-dimensional image display device of claim 4, wherein
    when the first sub-display panel, the third sub-display panel and the fourth sub-display panel display the two-dimensional image, the second sub-display panel and the fifth sub-display panel do not display the two-dimensional image.

6. The three-dimensional image display device of claim 4, wherein
    when the first sub-display panel, the second sub-display panel and the fifth sub-display panel display the two-dimensional image, the third sub-display panel and the fourth sub-display panel do not display the two-dimensional image.

7. The three-dimensional image display device of claim 1, further comprising:
    a reflecting member which sequentially reflects the two-dimensional image while the reflecting member rotates by a predetermined angle with respect to a center axis thereof.

8. The three-dimensional image display device of claim 1, wherein the second sub-display panel and the third sub-display panel are disposed entirely on the left side of the first sub-display panel, and
    wherein the fourth sub-display panel and the fifth sub-display panel are disposed entirely on the right side of the first sub-display panel.

* * * * *